(12) United States Patent
Wang

(10) Patent No.: US 9,877,186 B2
(45) Date of Patent: Jan. 23, 2018

(54) PHONE NUMBER SWITCHING METHOD, AND ASSOCIATED APPARATUS

(71) Applicant: MEDIATEK INC., Hsin-Chu (TW)

(72) Inventor: Tsung-Te Wang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/186,547

(22) Filed: Jun. 20, 2016

(65) Prior Publication Data
US 2017/0180983 A1 Jun. 22, 2017

Related U.S. Application Data

(60) Provisional application No. 62/270,680, filed on Dec. 22, 2015.

(51) Int. Cl.
H04M 3/42 (2006.01)
H04W 8/26 (2009.01)
H04W 8/18 (2009.01)
H04M 1/725 (2006.01)
H04L 29/08 (2006.01)

(52) U.S. Cl.
CPC ............ *H04W 8/26* (2013.01); *H04L 67/12* (2013.01); *H04M 1/72569* (2013.01); *H04M 3/42297* (2013.01); *H04W 8/183* (2013.01)

(58) Field of Classification Search
CPC ............ H04M 3/54; H04M 2242/22; H04M 3/42229; H04M 3/436; H04M 3/465; H04M 3/42102; H04M 15/55; H04M 2250/06; H04M 11/066; H04M 15/04; H04M 2215/2026; H04M 2215/32; H04M 3/2218; H04M 1/72519; H04M 1/006; H04M 1/72572; H04M 2250/56; H04M 1/72569; H04L 65/1053; H04L 65/1096; H04L 51/24; H04L 65/1069; H04L 41/0813; H04L 41/0869; H04L 65/1006; H04L 65/1016; H04L 65/103; H04L 65/104; H04L 65/1063; H04L 65/1073; H04B 1/3833; H04B 1/3877; H04B 1/71075
See application file for complete search history.

(56) References Cited

U.S. PATENT DOCUMENTS 6,253,088 B1 * 6/2001 Wenk .................... H04M 1/725
455/417
2002/0172336 A1 * 11/2002 Postma ................. G06F 1/1616
379/110.01

(Continued)

Primary Examiner — Nimesh Patel
(74) Attorney, Agent, or Firm — Winston Hsu

(57) ABSTRACT

A phone number switching method and an associated apparatus are provided, where the phone number switching method may be applied to a first electronic device. For example, the phone number switching method may include the steps of: determining whether a predetermined activity corresponding to both of the first electronic device and a second electronic device occurs, to generate a determination result; and according to the determination result, selectively sending a switching request from the first electronic device to a service provider, wherein a phone number is previously associated to a first subscriber identity module (SIM) within the first electronic device by the service provider, and the switching request asks for re-associating the phone number to a second SIM within the second electronic device.

20 Claims, 9 Drawing Sheets

(56) References Cited

U.S. PATENT DOCUMENTS

| | | | | |
|---|---|---|---|---|
| 2007/0263804 | A1* | 11/2007 | Lai | H04M 1/725 |
| | | | | 379/93.05 |
| 2012/0260090 | A1* | 10/2012 | Hauck | H04L 63/0853 |
| | | | | 713/168 |
| 2016/0164883 | A1* | 6/2016 | Li | H04W 4/008 |
| | | | | 726/7 |

* cited by examiner

PHONE NUMBER SWITCHING METHOD, AND ASSOCIATED APPARATUS

CROSS REFERENCE TO RELATED APPLICATIONS

This application claims the benefit of U.S. Provisional Application No. 62/270,680, which was filed on Dec. 22, 2015, and is included herein by reference.

BACKGROUND

The present invention relates to switching control of a phone number between portable electronic devices such as that capable of performing wireless communications, and more particularly, to a phone number switching method, and an associated apparatus.

According to the related art, a conventional portable electronic device such as a multifunctional mobile phone may be designed to have the capability of performing wireless communications based on various well-developed and well-defined wireless communications technologies (e.g. Global System for Mobile communications (GSM) technologies, Enhanced Data rates for GSM Evolution (EDGE) technologies, High Speed Packet Access (HSPA) technologies, Universal Mobile Telecommunications System (UMTS) technologies, Long Term Evolution (LTE) technologies, etc.), and the user of the conventional portable electronic device may make a phone call by using the conventional portable electronic device when the user brings the conventional portable electronic device with him/her. However, some problems may occur. For example, in a situation where the conventional portable electronic device is equipped with a large touch-sensitive display module (e.g. a liquid crystal display (LCD) touch screen such as that greater than five inches), it is not convenient for the user to bring it when he/she goes jogging. In another example, in a situation where the conventional portable electronic device is capable of performing Bluetooth (BT) communications and the user is making a phone call using a conventional BT watch wirelessly connected to the conventional portable electronic device during cooking in the kitchen, when the distance between the conventional BT watch and the conventional portable electronic device becomes greater than a maximum distance suitable for BT communications, the phone call may be interrupted due to disconnection between the conventional BT watch and the conventional portable electronic device. In some examples, the user may further buy a small mobile phone, but the user may need to have more than one phone number. Thus, a novel method and associated architecture are required for performing switching control of a phone number between portable electronic devices, in order to bring better user experience to a user such as that mentioned above.

SUMMARY

It is an objective of the claimed invention to provide a phone number switching method and an associated apparatus, in order to solve the above-mentioned problems.

It is another objective of the claimed invention to provide a phone number switching method and an associated apparatus, in order to bring better user experience to a user.

According to at least one preferred embodiment, a phone number switching method is provided, where the phone number switching method may be applied to a first electronic device. For example, the phone number switching method may comprise the steps of: determining whether a predetermined activity corresponding to both of the first electronic device and a second electronic device occurs, to generate a determination result; and according to the determination result, selectively sending a switching request from the first electronic device to a service provider, wherein a phone number is previously associated to a first subscriber identity module (SIM) within the first electronic device by the service provider, and the switching request asks for re-associating the phone number to a second SIM within the second electronic device. According to some embodiments, an apparatus for performing phone number switching according to the above phone number switching method is provided, where the apparatus may comprise at least one portion (e.g. a portion or all) of the first electronic device.

According to at least one preferred embodiment, an apparatus for performing phone number switching is provided, where the apparatus may comprise at least one portion (e.g. a portion or all) of a first electronic device. For example, the apparatus may comprise a determination circuit that is positioned in the first electronic device, and may further comprise a processing circuit that is positioned in the first electronic device and coupled to the determination circuit. The determination circuit may be arranged for determining whether a predetermined activity corresponding to both of the first electronic device and a second electronic device occurs, to generate a determination result. In addition, according to the determination result, the processing circuit may selectively send, by utilizing a transmitter within the first electronic device, a switching request from the first electronic device to a service provider, wherein a phone number is previously associated to a first subscriber identity module (SIM) within the first electronic device by the service provider, and the switching request asks for re-associating the phone number to a second SIM within the second electronic device.

According to at least one preferred embodiment, a phone number switching method is provided, where the phone number switching method may be applied to a second electronic device. For example, the phone number switching method may comprise the steps of: determining whether a predetermined activity corresponding to both of a first electronic device and the second electronic device occurs, to generate a determination result, wherein a phone number is previously associated to a first subscriber identity module (SIM) within the first electronic device by a service provider; and according to the determination result, selectively sending a signal to the first electronic device, wherein the signal indicates that sending a switching request to the service provider is required, and the switching request asks for re-associating the phone number to a second SIM within the second electronic device, wherein after receiving the signal from the second electronic device, the first electronic device sends the switching request to the service provider. According to some embodiments, an apparatus for performing phone number switching according to the above phone number switching method is provided, where the apparatus may comprise at least one portion (e.g. a portion or all) of the second electronic device.

According to at least one preferred embodiment, an apparatus for performing phone number switching is provided, where the apparatus may comprise at least one portion (e.g. a portion or all) of a second electronic device. For example, the apparatus may comprise a determination circuit that is positioned in the second electronic device, and may further comprise a processing circuit that is positioned in the second electronic device and coupled to the determination circuit. The determination circuit may be arranged for determining whether a predetermined activity corresponding to both of a first electronic device and the second electronic device occurs, to generate a determination result, wherein a phone number is previously associated to a first subscriber identity module (SIM) within the first electronic device by a service provider. In addition, according to the determination result, the processing circuit may selectively send, by utilizing a transmitter within the second electronic device, a signal to the first electronic device, wherein the signal indicates that sending a switching request to the service provider is required, and the switching request asks for re-associating the phone number to a second SIM within the second electronic device. Additionally, after receiving the signal from the second electronic device, the first electronic device sends the switching request to the service provider.

It is an advantage of the present invention that the phone number switching method and the associated apparatus can bring better user experience to a user, and the related art problems (e.g. the problem of bringing the conventional portable electronic device that is equipped with the large touch-sensitive display module during jogging, the problem of the phone call being interrupted due to the disconnection between the BT watch and the conventional portable electronic device, and the problem of needing to have more than one phone number) may no longer be an issue. In addition, as the phone number may be switchable between the first electronic device and the second electronic device, the user does not need to remove a SIM card from one electronic device (e.g. the conventional portable electronic device) and insert the SIM card into another electronic device (e.g. the small mobile phone mentioned above).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
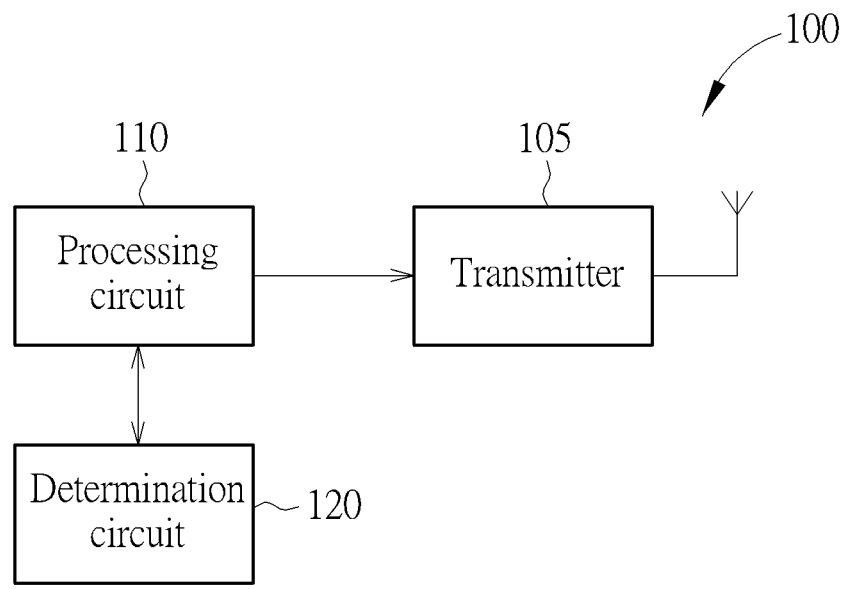
FIG. 1 is a diagram of an apparatus for performing phone number switching according to a first embodiment of the present invention.

FIG. 1 illustrates a diagram of an apparatus 100 for performing phone number switching according to a first embodiment of the present invention, where the apparatus 100 may comprise at least one portion (e.g. a portion or all) of an electronic device (e.g. a first electronic device, or a second electronic device). For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless communications system comprising the electronic device). Examples of the electronic device may include, but not limited to, a mobile phone (e.g. a multifunctional mobile phone), a tablet, a wearable electronic device (e.g. a watch, glasses, etc.), an Internet of Things (IoT) device, and a personal computer such as a laptop computer.

As shown in FIG. 1, the apparatus 100 may comprise at least one transmitter (e.g. one or more transmitter). The transmitter may be included in a transceiver, which may be arranged for performing wireless communications based on various well-developed and well-defined wireless communications technologies (e.g. Global System for Mobile communications (GSM) technologies, Enhanced Data rates for GSM Evolution (EDGE) technologies, High Speed Packet Access (HSPA) technologies, Universal Mobile Telecommunications System (UMTS) technologies, Long Term Evolution (LTE) technologies, Wireless-Fidelity (Wi-Fi) technologies, Bluetooth (BT) technologies, near field communication (NFC) technologies, etc.). The aforementioned at least one transmitter may be collectively referred to as the transmitter 105, for brevity. In addition, the apparatus 100 may further comprise a processing circuit 110 and a determination circuit 120, where the processing circuit 110 and the determination circuit 120 may be positioned in the electronic device (e.g. the first electronic device, or the second electronic device), and coupled to each other, and the processing circuit 110 may be coupled to the transmitter 105. For example, the processing circuit 110 may comprise at least one processor (e.g. one or more processors) arranged for running at least one program module (e.g. one or more program modules) such as a plurality of program modules. According to some embodiments, at least one portion (e.g. a portion or all) of the determination circuit 120 may be implemented with one of the program modules. This is for illustrative purposes only, and is not meant to be a limitation of the present invention. According to some embodiments, the determination circuit 120 may comprise a customized semiconductor chip (e.g. a NFC determination chip, or a BT determination chip). According to some embodiments, the determination circuit 120 may comprise at least one sensor (e.g. one or more sensors). Examples of the aforementioned at least one sensor may include, but not limited to, proximity sensor(s), infrared (IR) sensor(s), g-sensor(s), gyro meter(s), etc. According to some embodiments, the transmitter 105 may be integrated into the determination circuit 120. According to some embodiments, the transmitter 105 may be integrated into the processing circuit 110. According to some embodiments, the transmitter 105, the processing circuit 110, and the determination circuit 120 may be integrated into the same IC.

According to the embodiment shown in FIG. 1, the processing circuit 110 may be arranged for controlling operations of the electronic device (e.g. the first electronic device, or the second electronic device), and the determination circuit 120 may be arranged for performing determination for the electronic device. For example, in a situation where the electronic device represents the first electronic device, the determination circuit 120 may be arranged for determining whether the second electronic device approaches or touches the first electronic device, and more particularly, may be arranged for determining whether the second electronic device is close to or in contact with the first electronic device. When it is determined that the second electronic device approaches or touches the first electronic device (e.g. the second electronic device is close to or in contact with the first electronic device), the processing circuit 110 may communicate with a service provider to ask for switching a set of services (e.g. a phone call service, a data communications service, etc.) corresponding to a phone number from the first electronic device to the second electronic device. In another example, in a situation where the electronic device represents the second electronic device, the determination circuit 120 may be arranged for determining whether the first electronic device approaches or touches the second electronic device, and more particularly, may be arranged for determining whether the first electronic device is close to or in contact with the second electronic device. When it is determined that the first electronic device approaches or touches the second electronic device (e.g. the first electronic device is close to or in contact with the second electronic device), the processing circuit 110 may communicate with the service provider and/or the communications network to ask for switching a set of services such as that mentioned above (e.g. the phone call service, the data communications service, etc.) corresponding to the phone number from the first electronic device to the second electronic device. In another example, in a situation where the electronic device represents the second electronic device, the determination circuit 120 may be arranged for determining whether the first electronic device approaches or touches the second electronic device, and more particularly, may be arranged for determining whether the first electronic device is close to or in contact with the second electronic device. When it is determined that the first electronic device approaches or touches the second electronic device (e.g. the first electronic device is close to or in contact with the second electronic device), the processing circuit 110 may send a signal to the first electronic device, where the signal may indicate that asking for switching a set of services such as that mentioned above (e.g. the phone call service, the data communications service, etc.) corresponding to the phone number from the first electronic device to the second electronic device is required. Depending on the type of the signal, the signal may be sent by utilizing one or more components, examples of which may include, but not limited to, a transmitter, a light emitting diode (LED), an infrared (IR) emitter, etc. According to some embodiments, the aforementioned one or more components may be located inside or outside the second electronic devices. Additionally, after receiving the signal from the second electronic device, the first electronic device may communicate with the service provider and/or the communications network to ask for switching the set of services (e.g. the phone call service, the data communications service, etc.) corresponding to the phone number from the first electronic device to the second electronic device.

Figure 2:
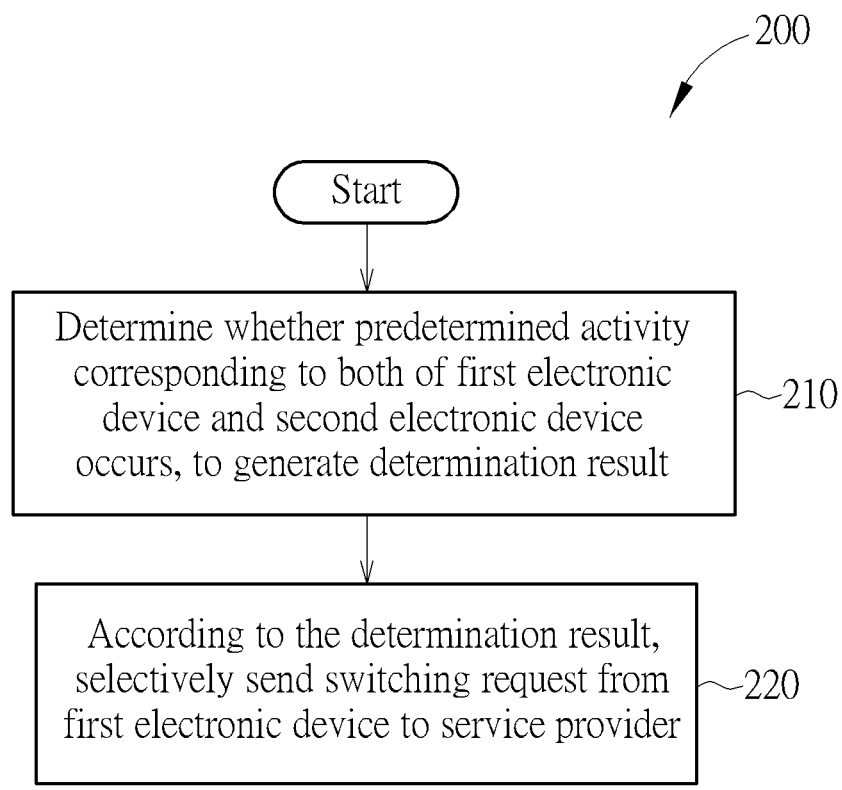
FIG. 2 illustrates a flowchart of a phone number switching method according to an embodiment of the present invention.

FIG. 2 illustrates a flowchart of a phone number switching method 200 according to an embodiment of the present invention. The method 200 shown in FIG. 2 can be applied to the apparatus 100 shown in FIG. 1, and more particularly, the processing circuit 110. The method 200 can also be applied to the aforementioned at least one processor thereof and some program modules running on the processor. For example, the program modules may be provided through a computer program product having program instructions for instructing the aforementioned at least one processor to perform the method 200 shown in FIG. 2, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. For better comprehension, the electronic device may represent the first electronic device, and the method can be described as follows.

In Step 210, the determination circuit 120 (of the first electronic device) may determine whether a predetermined activity corresponding to both of the first electronic device and the second electronic device occurs, to generate a determination result. For example, the predetermined activity may comprise the user making one of the first and the second electronic devices send a signal to the other of the first and the second electronic devices, the user making the second electronic device be close to or in contact with the first electronic device, etc. The user may make one of the first and the second electronic devices send a signal by pressing virtual or physical button(s), selecting menu item(s) on the first electronic device and/or the second electronic device, etc. Depending on the type of the signal, the signal may be sent by utilizing one or more components, examples of which may include, but not limited to, a transmitter such as the transmitter 105, a light emitting diode (LED), an infrared (IR) emitter, etc. According to some embodiments, the aforementioned one or more components may be located inside or outside the one of the first and the second electronic devices. For example, the signal may indicate that sending a switching request to the service provider is required. In this embodiment, in Step 210, the determination circuit 120 may determine whether the second electronic device is close to or in contact with the first electronic device, to generate the determination result. According to some embodiments, the first electronic device and the second electronic device may comprise a wearable electronic device, a mobile phone, a tablet, or an IoT device. For example, the first electronic device may be a mobile phone, and the second electronic device may be a wearable electronic device. This is for illustrative purposes only, and is not meant to be a limitation of the present invention. For example, the first electronic device may be a wearable electronic device, and the second electronic device may be a mobile phone.

In Step 220, according to the determination result, the processing circuit 110 (of the first electronic device) may selectively send, by utilizing the transmitter 105 (within the first electronic device), a switching request from the first electronic device to a service provider. The transmitter 105 may be included in a transceiver such as that mentioned above. A phone number such as that mentioned above may be previously associated to a first subscriber identity module (SIM) within the first electronic device by the service provider, and the switching request may ask for re-associating the phone number to a second SIM within the second electronic device. As a result, the service provider may re-associate the phone number to the second SIM within the second electronic device. According to some embodiments, at least one of the first SIM and the second SIM may be a SIM card. This is for illustrative purposes only, and is not meant to be a limitation of the present invention. According to some embodiments, at least one of the first SIM and the second SIM may be an embedded SIM (e-SIM). According to some embodiments, each of the first SIM and the second SIM may be any of various types of SIMs. Examples of the first SIM and the second SIM may include, but not limited to, a SIM card (e.g. a micro-SIM, a nano-SIM, etc.), an e-SIM, a non-removable SIM circuit, a virtual SIM, and a program emulated SIM (e.g. a soft-SIM).

In a situation where the electronic device represents the first electronic device, the first electronic device (more particularly, the determination circuit 120 therein) may determine whether the predetermined activity corresponding to both of the first electronic device and the second electronic device occurs. This is for illustrative purposes only, and is not meant to be a limitation of the present invention. According to some embodiments, the second electronic device may determine whether another predetermined activity corresponding to both of the first electronic device and the second electronic device occurs, to generate another determination result. In addition, according to the other determination result, the second electronic device may selectively send another switching request from the second electronic device to the service provider. For example, the phone number may have been re-associated to the second SIM (e.g. as a result of performing the operation of Step 220), and the other switching request may ask for re-associating the phone number to the first SIM. As a result, the service provider may re-associate the phone number to the first SIM within the first electronic device.

According to some embodiments, the phone number may have been re-associated to the second SIM (e.g. as a result of performing the operation of Step 220). For example, the phone number may be a first phone number. In addition, the first electronic device may be equipped with another SIM, and another phone number such as a second phone number may be associated to the other SIM within the first electronic device. Additionally, the phone number switching method 200 may further comprise performing communications between the first electronic device and the second electronic device with aid of the other SIM within the first electronic device and the second SIM within the second electronic device. For example, the first electronic device and the second electronic device may perform the communications between the first electronic device and the second electronic device, through the second phone number that is associated to the other SIM within the first electronic device and the first phone number that has been re-associated to the second SIM within the second electronic device.

According to some embodiments, the predetermined activity may comprise the second electronic device sending a signal to the first electronic device. For example, the signal may indicate that sending the switching request to the service provider is required. In addition, after receiving the signal from the second electronic device, the first electronic device may send the switching request to the service provider.

Figure 3:
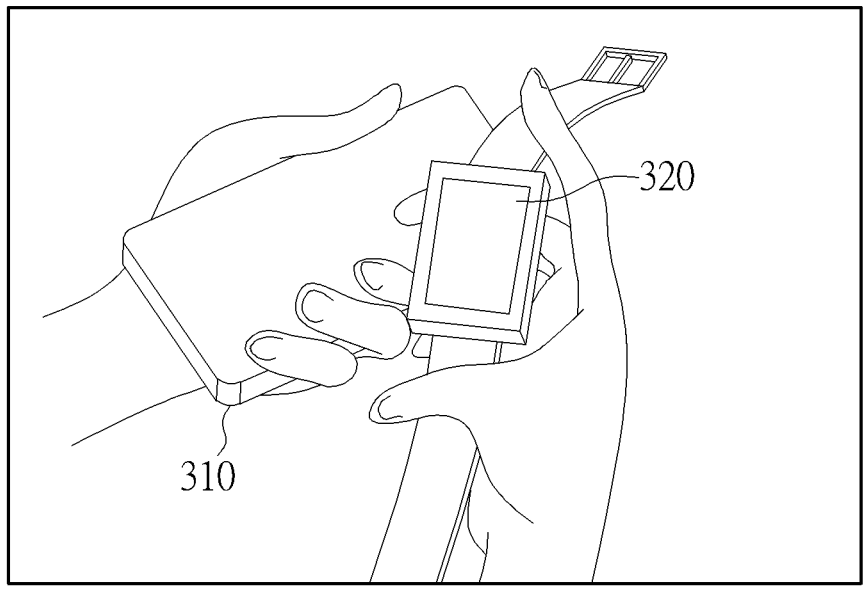
FIG. 3 illustrates a switching control scheme involved with the phone number switching method shown in FIG. 2 according to an embodiment of the present invention.
Figure 3:
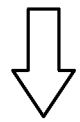
Figure 3:
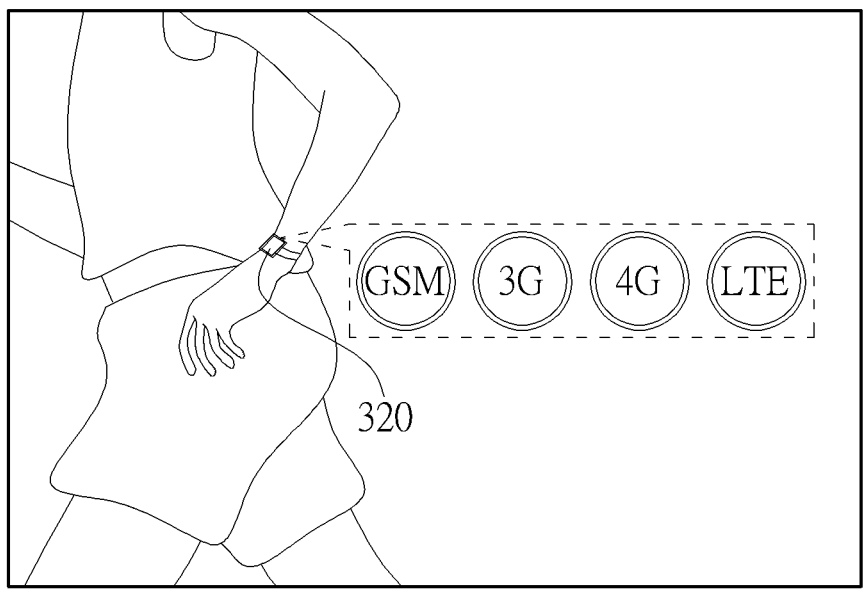

FIG. 3 illustrates a switching control scheme involved with the phone number switching method 200 shown in FIG. 2 according to an embodiment of the present invention. For better comprehension, the mobile phone 310 can be taken as an example of the first electronic device, and the wearable electronic device 320 (e.g. a watch) can be taken as an example of the second electronic device. This is for illustrative purposes only, and is not meant to be a limitation of the present invention. According to some embodiments, the mobile phone 310 can be taken as an example of the second electronic device, and the wearable electronic device 320 (e.g. the watch) can be taken as an example of the first electronic device.

In the embodiment shown in FIG. 3, the phone number is previously associated to the first SIM within the first electronic device (e.g. the SIM in the mobile phone 310). As shown in FIG. 3, the user may use the wearable electronic device 320 to touch or approach the mobile phone 310. As a result of performing the operation of Step 220, the switching request is sent from the first electronic device such as the mobile phone 310 to the service provider, and then the service provider may re-associate the same phone number to the second SIM within the second electronic device (e.g. the SIM in the wearable electronic device 320), so this phone number is switched to the wearable electronic device 320. For example, the set of services (e.g. the phone call service, the data communications service, etc.) corresponding to the phone number, such as the wireless communications services based on GSM, the third generation (3G), the fourth generation (4G), and/or Long Term Evolution (LTE) technologies, may be switched from the first electronic device such as the mobile phone 310 to the second electronic device such as the wearable electronic device 320. Therefore, everything becomes easy to the user, where the related art problems (e.g. the problem of bringing the conventional portable electronic device that is equipped with the large touch-sensitive display module during jogging, the problem of the phone call being interrupted due to the disconnection between the BT watch and the conventional portable electronic device, and the problem of needing to have more than one phone number) are no longer an issue. For brevity, similar descriptions for this embodiment are not repeated in detail here.

Figure 4:
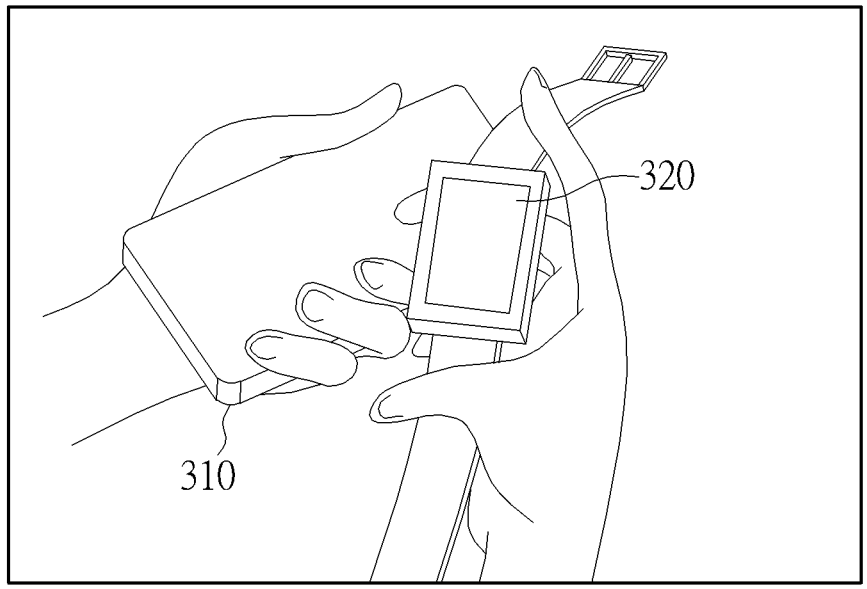
FIG. 4 illustrates a switch-back control scheme involved with the phone number switching method shown in FIG. 2 according to an embodiment of the present invention.
Figure 4:
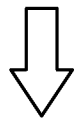
Figure 4:
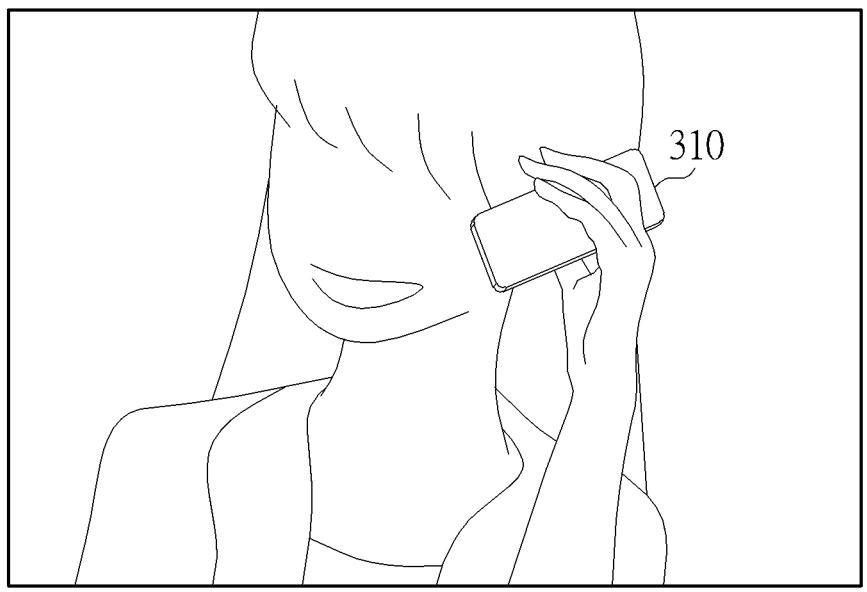

FIG. 4 illustrates a switch-back control scheme involved with the phone number switching method 200 shown in FIG. 2 according to an embodiment of the present invention. For better comprehension, the mobile phone 310 can be taken as an example of the first electronic device, and the wearable electronic device 320 (e.g. a watch) can be taken as an example of the second electronic device. This is for illustrative purposes only, and is not meant to be a limitation of the present invention. According to some embodiments, the mobile phone 310 can be taken as an example of the second electronic device, and the wearable electronic device 320 (e.g. the watch) can be taken as an example of the first electronic device.

In the embodiment shown in FIG. 4, the phone number may have been re-associated to the second SIM (e.g. the SIM in the wearable electronic device 320) based on the switching control scheme shown in FIG. 3. As shown in FIG. 4, the user may use the wearable electronic device 320 to touch or approach the mobile phone 310. As a result, the other switching request may be sent from the second electronic device such as the wearable electronic device 320 to the service provider, and then the service provider may re-associate the same phone number to the first SIM within the first electronic device (e.g. the SIM in the mobile phone 310), so this phone number may be switched to the mobile phone 310. For example, the set of services (e.g. the phone call service, the data communications service, etc.) corresponding to the phone number may be switched from the second electronic device such as the wearable electronic device 320 back to the first electronic device such as the mobile phone 310. Therefore, the user may use the mobile phone 310 as usual. For brevity, similar descriptions for this embodiment are not repeated in detail here.

Figure 5:
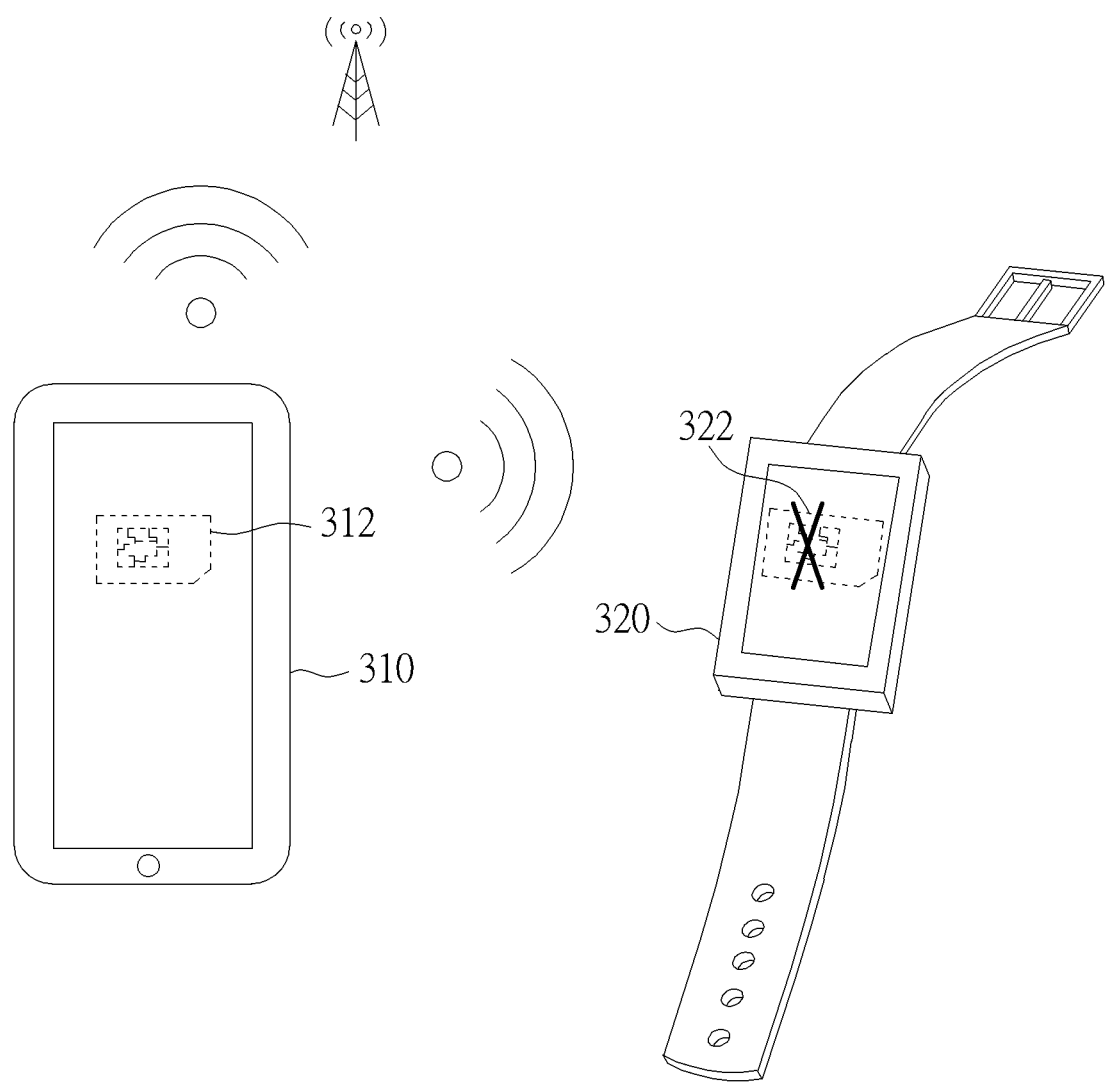
FIG. 5 illustrates a first mode involved with the phone number switching method shown in FIG. 2 according to an embodiment of the present invention.

FIG. 5 illustrates a first mode involved with the phone number switching method 200 shown in FIG. 2 according to an embodiment of the present invention. For better comprehension, the SIM card 312 in the mobile phone 310 can be taken as an example of the first SIM within the first electronic device, and the e-SIM 322 in the wearable electronic device 320 (e.g. the watch) can be taken as an example of the second SIM within the second electronic device. This is for illustrative purposes only, and is not meant to be a limitation of the present invention. According to some embodiments, the types of SIMs in these electronic devices (e.g. the mobile phone 310 and the wearable electronic device 320) may vary.

In the embodiment shown in FIG. 5, a phone call coming through one number such as the phone number mentioned above may be answered through the mobile phone 310 in the first mode, and the e-SIM 322 may not work in the first mode, where the notation "X" illustrated on the e-SIM 322 indicates that the e-SIM 322 is an inactive SIM (e.g. no phone number is associated to the e-SIM 322 now) in the first mode. In addition, in the first mode, the wearable electronic device 320 may communicate with the mobile phone 310 via wireless communications based on Wi-Fi technologies, BT technologies, etc. For brevity, similar descriptions for this embodiment are not repeated in detail here.

Figure 6:
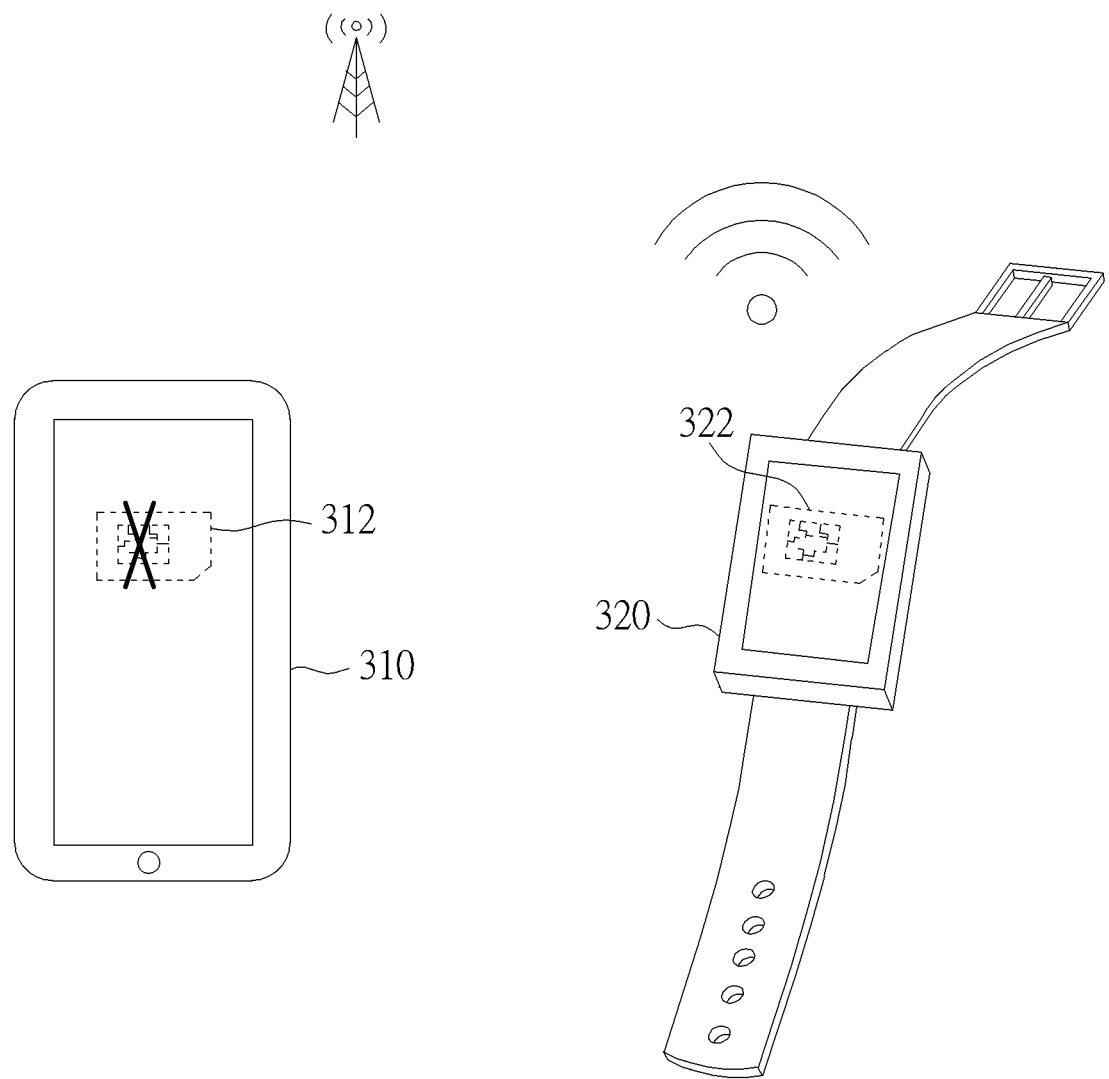
FIG. 6 illustrates a second mode involved with the phone number switching method shown in FIG. 2 according to another embodiment of the present invention.

FIG. 6 illustrates a second mode involved with the phone number switching method 200 shown in FIG. 2 according to another embodiment of the present invention. For better comprehension, the SIM card 312 in the mobile phone 310 can be taken as an example of the first SIM within the first electronic device, and the e-SIM 322 in the wearable electronic device 320 (e.g. the watch) can be taken as an example of the second SIM within the second electronic device. This is for illustrative purposes only, and is not meant to be a limitation of the present invention. According to some embodiments, the types of SIMs in these electronic devices (e.g. the mobile phone 310 and the wearable electronic device 320) may vary.

In the embodiment shown in FIG. 6, the user may have used the wearable electronic device 320 to touch or approach the mobile phone 310, and the phone number may have been re-associated to the second SIM (e.g. the e-SIM 322 in the wearable electronic device 320) based on the switching control scheme shown in FIG. 3. As a result, the user may use the same phone number while wearing the wearable electronic device 320, having no need to bring the mobile phone 310. For example, the wearable electronic device 320 may connect to the service provider and/or the communications network for the set of services (e.g. the phone call service, the data communications service, etc.) corresponding to the phone number that has been switched from the first electronic device such as the mobile phone 310 to the second electronic device such as the wearable electronic device 320, where the notation "X" illustrated on the SIM card 312 indicates that the SIM card 312 is an inactive SIM (e.g. no phone number is associated to the SIM card 312 now) in the second mode. In addition, in the second mode, the mobile phone 310 may communicate with the wearable electronic device 320 via wireless communications based on Wi-Fi technologies, BT technologies, etc. For brevity, similar descriptions for this embodiment are not repeated in detail here.

According to some embodiments, when the second electronic device is close to or in contact with the first electronic device, the second electronic device may send a signal to the first electronic device, where the signal may indicate that sending the switching request to the service provider is required. In addition, after receiving the signal from the second electronic device, the first electronic device may send the switching request to the service provider.

Figure 7:
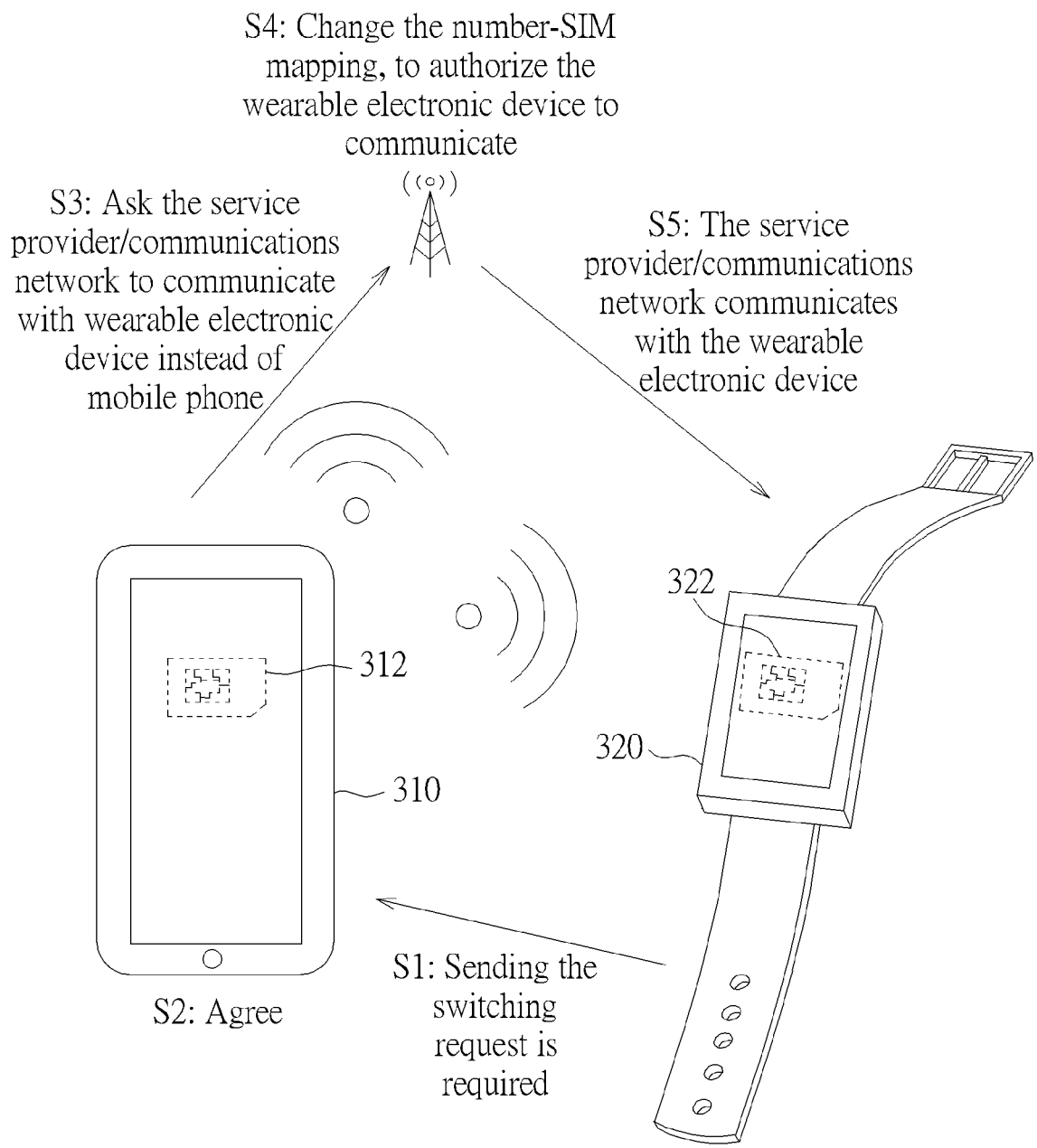
FIG. 7 illustrates some implementation details of the switching control scheme shown in FIG. 3 according to an embodiment of the present invention.

FIG. 7 illustrates some implementation details of the switching control scheme shown in FIG. 3 according to an embodiment of the present invention, where the notations "S1" through to "S5" may represent a plurality of steps. In some embodiments, the steps can be performed in an order different from the order shown in FIG. 7, and one or more steps can be omitted or added. For better comprehension, the mobile phone 310 can be taken as an example of the first electronic device, and the wearable electronic device 320 (e.g. a watch) can be taken as an example of the second electronic device. This is for illustrative purposes only, and is not meant to be a limitation of the present invention.

In Step S1, the wearable electronic device 320 may send the signal to the mobile phone 310. The signal may indicate that sending the switching request to the service provider is required. In different implementations, the signal may be of different forms. For example, the signal may be a signal complying with one of the wireless communications protocols, such as Wi-Fi, Bluetooth, etc. As another example, the signal may be a signal that can be sensed by a sensor, such as infrared sensor, ambient light sensor, etc. This is for illustrative purposes only, and is not meant to be a limitation of the present invention.

In Step S2, the mobile phone 310 may receive the signal and agree. For example, in response to the signal, the mobile phone 310 may send a response (e.g. an acknowledgement signal) to the wearable electronic device 320.

In Step S3, by sending the switching request, the mobile phone 310 may ask the service provider and/or the communications network to communicate with the wearable electronic device 320 instead of the mobile phone 310.

In Step S4, the service provider may change the number-SIM mapping, to authorize the wearable electronic device 320 to communicate. As a result, the service provider has re-associated the same phone number to the e-SIM 322 in the wearable electronic device 320, so this phone number is switched to the wearable electronic device 320.

In Step S5, the service provider and/or the communications network (more particularly, the base station thereof) may communicate with the wearable electronic device 320, where the mobile phone 310 may be disconnected with the service provider and/or the communications network.

For example, the set of services (e.g. the phone call service, the data communications service, etc.) corresponding to the phone number may have been switched from the first electronic device such as the mobile phone 310 to the second electronic device such as the wearable electronic device 320. For brevity, similar descriptions for this embodiment are not repeated in detail here.

Figure 8:
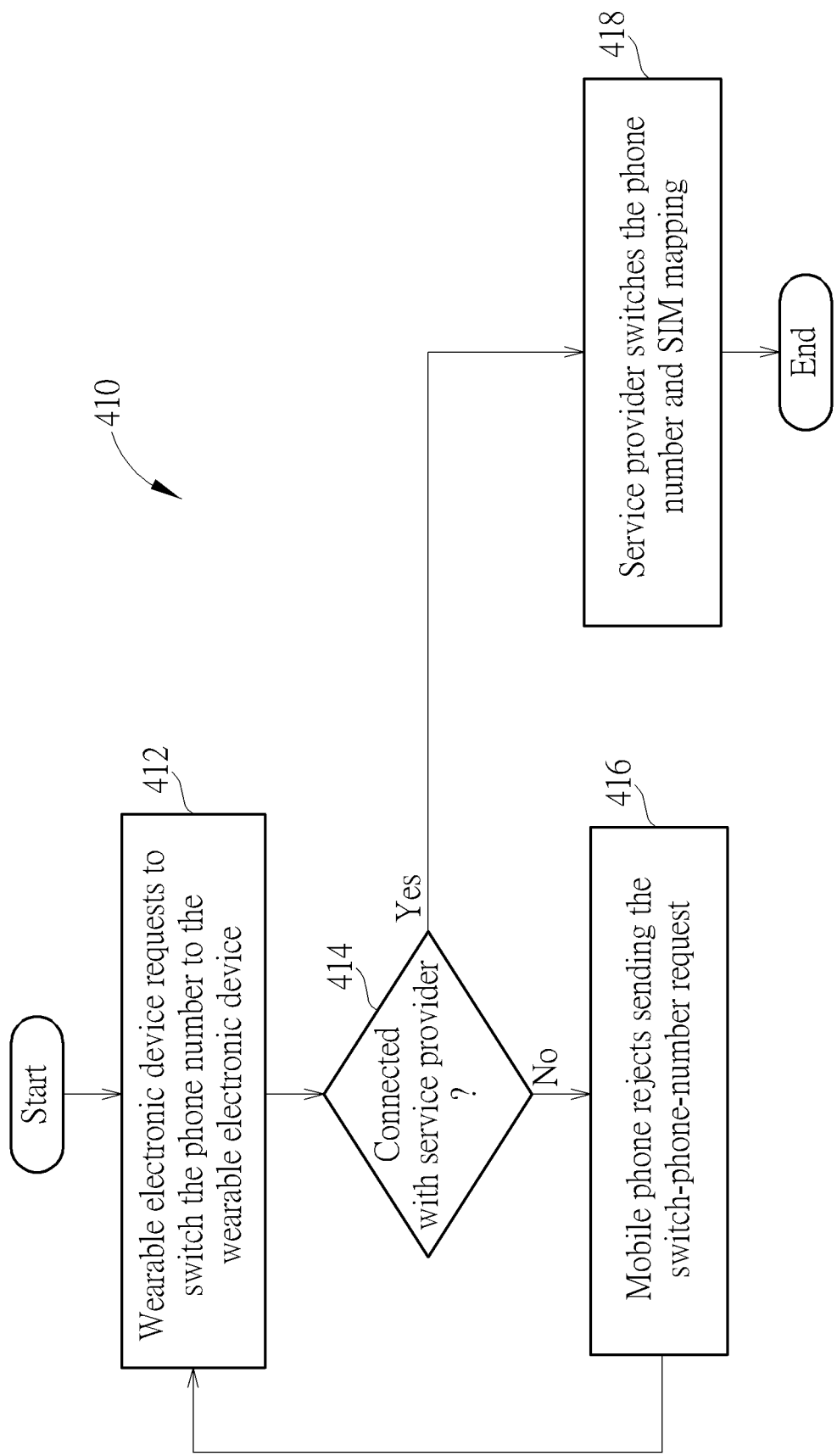
FIG. 8 illustrates a working flow involved with the phone number switching method shown in FIG. 2 according to an embodiment of the present invention.

FIG. 8 illustrates a working flow 410 involved with the phone number switching method 200 shown in FIG. 2 according to an embodiment of the present invention, where the operations of the working flow 410 may be performed based on the switching control scheme shown in FIG. 3. In some embodiments, the steps can be performed in an order different from the order shown in FIG. 8, and one or more steps can be omitted or added. For example, the SIM in the wearable electronic device 320 of this embodiment may be the e-SIM 322. This is for illustrative purposes only, and is not meant to be a limitation of the present invention. According to some embodiments, the SIM in the wearable electronic device 320 may vary. Examples of the SIM in the wearable electronic device 320 may include, but not limited to, a SIM card (e.g. a nano-SIM) and a program emulated SIM (e.g. a soft-SIM). In addition, the SIM in the mobile phone 310 of this embodiment may be the SIM card 312 such as a nano-SIM. This is for illustrative purposes only, and is not meant to be a limitation of the present invention. According to some embodiments, the SIM in the mobile phone 310 may vary. Examples of the SIM in the mobile phone 310 may include, but not limited to, an e-SIM and a program emulated SIM (e.g. a soft-SIM).

In Step 412, by sending a signal such as that mentioned in some embodiments described above to the mobile phone 310, the wearable electronic device 320 (e.g. the watch such as a smart watch, or a smart-band) may request to switch the phone number to the wearable electronic device 320.

In Step 414, the mobile phone 310 may determine whether the mobile phone 310 is successfully connected with the service provider to ask for phone number switching (labeled "Connected with service provider?" in FIG. 8, for brevity). When it is determined that the mobile phone 310 is successfully connected with the service provider to ask for phone number switching, Step 418 is entered; otherwise, Step 416 is entered.

In Step 416, the mobile phone 310 may reject sending the switch-phone-number request, i.e. the request of switching the phone number in this embodiment.

In Step 418, the service provider may switch the phone number and SIM mapping, i.e. the mapping relationship between the phone number and the associated SIM. For example, the service provider may maintain a phone number and SIM mapping table, and may update the mapping relationship between the phone number and the associated SIM in the phone number and SIM mapping table. As a result of performing the operation of Step 418, the phone number may be re-associated to the SIM in the wearable electronic device 320.

According to this embodiment, in the phone number and SIM mapping table, one phone number can be assigned to one of different SIMs (e.g. SIM cards, etc.) by user request(s). For brevity, similar descriptions for this embodiment are not repeated in detail here.

According to some embodiments, the phone number and SIM mapping table can be a phone number and SIM card mapping table. This is for illustrative purposes only, and is not meant to be a limitation of the present invention.

Figure 9:
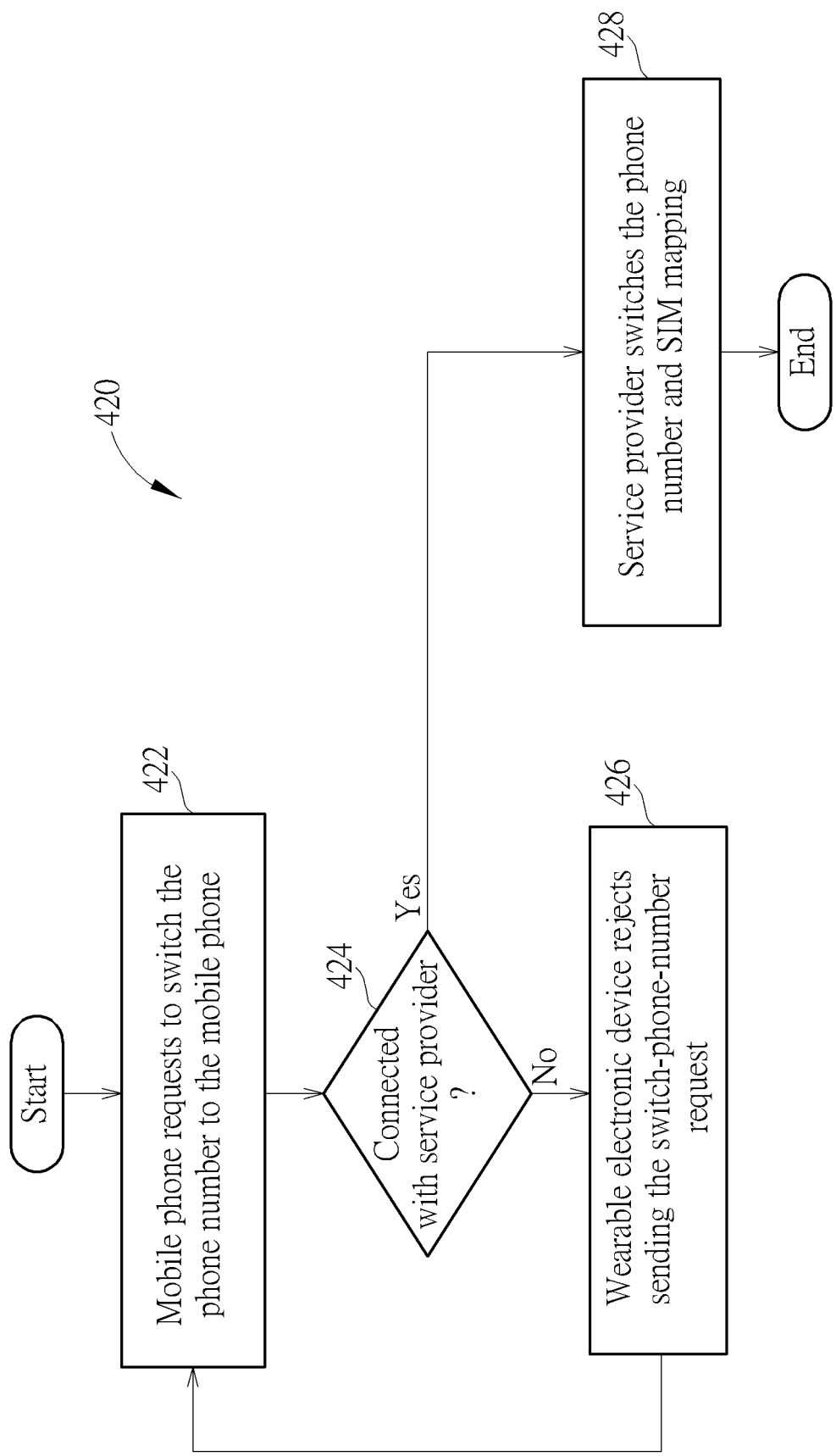
FIG. 9 illustrates a working flow involved with the phone number switching method shown in FIG. 2 according to another embodiment of the present invention.

FIG. 9 illustrates a working flow 420 involved with the phone number switching method 200 shown in FIG. 2 according to another embodiment of the present invention, where the operations of the working flow 420 may be performed based on the switch-back control scheme shown in FIG. 4. In some embodiments, the steps can be performed in an order different from the order shown in FIG. 9, and one or more steps can be omitted or added. For example, the SIM in the mobile phone 310 of this embodiment may be the SIM card 312 such as a nano-SIM. This is for illustrative purposes only, and is not meant to be a limitation of the present invention. According to some embodiments, the SIM in the mobile phone 310 may vary. Examples of the SIM in the mobile phone 310 may include, but not limited to, an e-SIM and a program emulated SIM (e.g. a soft-SIM). In addition, the SIM in the wearable electronic device 320 of this embodiment may be the e-SIM 322. This is for illustrative purposes only, and is not meant to be a limitation of the present invention. According to some embodiments, the SIM in the wearable electronic device 320 may vary. Examples of the SIM in the wearable electronic device 320 may include, but not limited to, a SIM card (e.g. a nano-SIM) and a program emulated SIM (e.g. a soft-SIM).

In Step 422, by sending a signal such as that mentioned in some embodiments described above to the wearable electronic device 320 (e.g. the watch such as a smart watch, or a smart-band), the mobile phone 310 may request to switch the phone number to the mobile phone 310.

In Step 424, the wearable electronic device 320 may determine whether the wearable electronic device 320 is successfully connected with the service provider to ask for phone number switching (labeled "Connected with service provider?" in FIG. 9, for brevity). When it is determined that the wearable electronic device 320 is successfully connected with the service provider to ask for phone number switching, Step 428 is entered; otherwise, Step 426 is entered.

In Step 426, the wearable electronic device 320 may reject sending the switch-phone-number request, i.e. the request of switching the phone number in this embodiment.

In Step 428, the service provider may switch the phone number and SIM mapping, i.e. the mapping relationship between the phone number and the associated SIM. For example, the service provider may maintain the phone number and SIM mapping table, and may update the mapping relationship between the phone number and the associated SIM in the phone number and SIM mapping table. As a result of performing the operation of Step 428, the phone number is re-associated to the SIM in the mobile phone 310.

According to this embodiment, in the phone number and SIM mapping table, one phone number can be assigned to one of different SIMs (e.g. SIM cards, etc.) by user request(s). For brevity, similar descriptions for this embodiment are not repeated in detail here.

According to some embodiments, the phone number and SIM mapping table can be a phone number and SIM card mapping table. This is for illustrative purposes only, and is not meant to be a limitation of the present invention.

According to some embodiments, the number of electronic devices may be greater than two. For example, the second electronic device may determine whether a predetermined activity corresponding to another electronic device occurs, to generate another determination result. In addition, according to the other determination result, the second electronic device may selectively send another switching request from the second electronic device to the service provider. For example, the phone number may have been re-associated to the second SIM (e.g. as a result of performing the operation of Step 220), and the other switching request may ask for re-associating the phone number to a SIM within the other electronic device. As a result, the service provider may re-associate the phone number to the SIM within the other electronic device. For brevity, similar descriptions for these embodiments are not repeated in detail here.

According to some embodiments, as the phone number switching method 200 may be applied to both of the first electronic device and the second first electronic device, the phone number switching method 200 may also be described with the electronic device representing the second electronic device.

Figure 10:
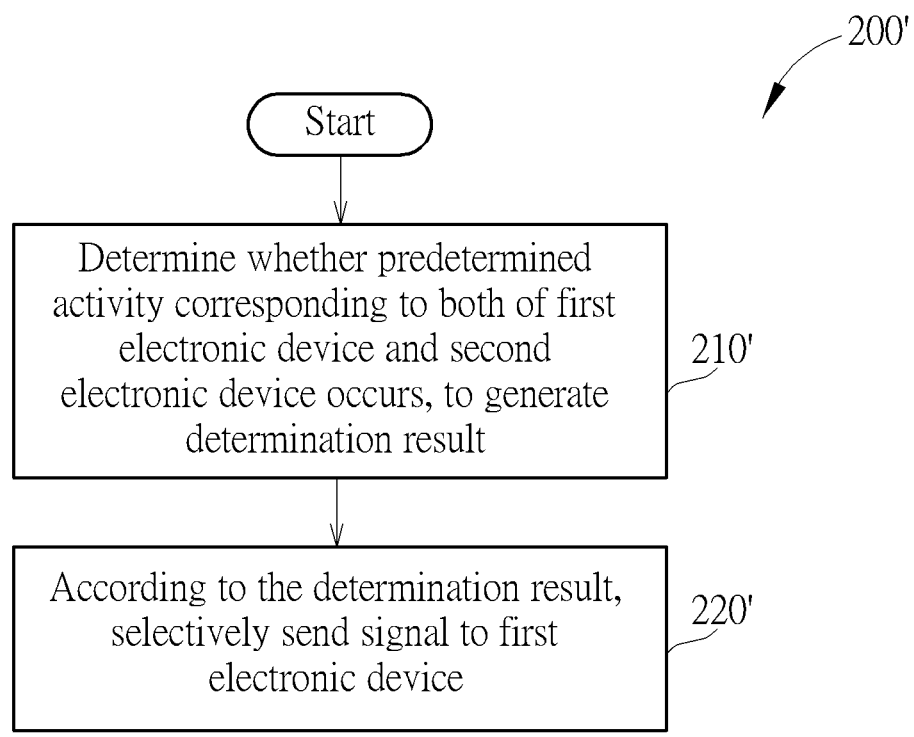
FIG. 10 illustrates a flowchart of a phone number switching method according to another embodiment of the present invention.

FIG. 10 illustrates a flowchart of a phone number switching method 200' according to another embodiment of the present invention. The method 200' shown in FIG. 10 can be applied to the apparatus 100 shown in FIG. 1, and more particularly, the processing circuit 110. The method 200' can also be applied to the aforementioned at least one processor thereof and some program modules running on the processor. For example, the program modules may be provided through a computer program product having program instructions for instructing the aforementioned at least one processor to perform the method 200' shown in FIG. 10, where the computer program product may be implemented as a non-transitory computer-readable medium (e.g. a floppy disk or a CD-ROM) storing the program instructions or an equivalent version thereof, such as a software package for being installed. This is for illustrative purposes only, and is not meant to be a limitation of the present invention. For better comprehension, the electronic device may represent the second electronic device, and the method can further be described as follows.

In Step 210', the determination circuit 120 (of the second electronic device) may determine whether a predetermined activity corresponding to both of the first electronic device and the second electronic device occurs, to generate a determination result. For example, the predetermined activity may comprise the user pressing virtual or physical button(s) on the first electronic device and/or the second electronic device, the user selecting menu item(s) on the first electronic device and/or the second electronic device, the user making the second electronic device be close to or in contact with the first electronic device, etc. A phone number such as that mentioned above may be previously associated to the first SIM within the first electronic device by the service provider. In this embodiment, in Step 210', the determination circuit 120 may determine whether the second electronic device is close to or in contact with the first electronic device, to generate this determination result. According to some embodiments, the first electronic device and the second electronic device may comprise a wearable electronic device, a mobile phone, a tablet, or an IoT device. For example, the first electronic device may be a mobile phone, and the second electronic device may be a wearable electronic device. This is for illustrative purposes only, and is not meant to be a limitation of the present invention. For example, the first electronic device may be a wearable electronic device, and the second electronic device may be a mobile phone.

In Step 220', according to the determination result (i.e. the determination result mentioned in Step 210'), the processing circuit 110 (of the second electronic device) may selectively send a signal such as that mentioned above to the first electronic device. Depending on the type of the signal, the signal may be sent by utilizing one or more components, examples of which may include, but not limited to, a transmitter such as the transmitter 105, a light emitting diode (LED), an infrared (IR) emitter, etc. According to some embodiments, the aforementioned one or more components may be located inside or outside the second electronic device. For example, the transmitter 105 may be included in a transceiver. The signal may indicate that sending a switching request such as that mentioned above from the first electronic device to the service provider is required, and the switching request may ask for re-associating the phone number to the second SIM within the second electronic device. In addition, after receiving the signal from the second electronic device, the first electronic device may send the switching request to the service provider. As a result, the service provider may re-associate the phone number to the second SIM within the second electronic device. According to some embodiments, at least one of the first SIM and the second SIM may be a SIM card. This is for illustrative purposes only, and is not meant to be a limitation of the present invention. According to some embodiments, at least one of the first SIM and the second SIM may be an embedded SIM (e-SIM). According to some embodiments, each of the first SIM and the second SIM may be any of various types of SIMs. Examples of the first SIM and the second SIM may include, but not limited to, a SIM card (e.g. a micro-SIM, a nano-SIM, etc.), an e-SIM, a non-removable SIM circuit, a virtual SIM, and a program emulated SIM (e.g. a soft-SIM).

In a situation where the electronic device represents the second electronic device, the second electronic device (more particularly, the determination circuit 120 therein) may determine whether the predetermined activity corresponding to both of the first electronic device and the second electronic device occurs, to generate the determination result mentioned in Step 210'. This is for illustrative purposes only, and is not meant to be a limitation of the present invention. According to some embodiments, the second electronic device may determine whether another predetermined activity corresponding to both of the first electronic device and the second electronic device occurs, to generate another determination result. In addition, according to the other determination result, the second electronic device may selectively send another switching request from the second electronic device to the service provider. For example, the phone number may have been re-associated to the second SIM (e.g. as a result of performing the operation of Step 220'), and the other switching request may ask for re-associating the phone number to the first SIM. As a result, the service provider may re-associate the phone number to the first SIM within the first electronic device. For brevity, similar descriptions for this embodiment and some associated embodiments corresponding to this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phone number switching method, the phone number switching method being applied to a first electronic device, the phone number switching method comprising the steps of:
   determining whether a predetermined activity corresponding to both of the first electronic device and a second electronic device occurs, to generate a determination result; and
   according to the determination result, selectively sending a switching request from the first electronic device to a service provider, wherein a phone number is previously associated to a first subscriber identity module (SIM) within the first electronic device by the service provider, and the switching request asks for re-associating the phone number to a second SIM within the second electronic device;

wherein the second SIM is a physical component positioned within the second electronic device.

2. The phone number switching method of claim 1, wherein the predetermined activity comprises making the second electronic device be close to or in contact with the first electronic device.

3. The phone number switching method of claim 2, wherein the step of determining whether the predetermined activity occurs to generate the determination result further comprises:

determining whether the second electronic device is close to or in contact with the first electronic device, to generate the determination result.

4. The phone number switching method of claim 1, wherein the predetermined activity comprises the second electronic device sending a signal to the first electronic device, wherein the signal indicates that sending the switching request to the service provider is required; and after receiving the signal from the second electronic device, the first electronic device sends the switching request to the service provider.

5. The phone number switching method of claim 1, wherein at least one of the first SIM and the second SIM is a SIM card.

6. The phone number switching method of claim 1, wherein at least one of the first SIM and the second SIM is an embedded SIM (e-SIM).

7. The phone number switching method of claim 1, wherein the first electronic device and the second electronic device comprise a wearable electronic device, a mobile phone, an Internet of Things (IoT) device, or a tablet.

8. The phone number switching method of claim 1, wherein the second electronic device determines whether another predetermined activity corresponding to both of the first electronic device and the second electronic device occurs, to generate another determination result; and according to the other determination result, the second electronic device selectively sends another switching request from the second electronic device to the service provider, wherein the other switching request asks for re-associating the phone number to the first SIM.

9. The phone number switching method of claim 1, wherein the phone number has been re-associated to the second SIM; the first electronic device is equipped with another SIM, and another phone number is associated to the other SIM within the first electronic device; and the phone number switching method further comprises:

performing communications between the first electronic device and the second electronic device with aid of the other SIM within the first electronic device and the second SIM within the second electronic device.

10. An apparatus for performing phone number switching, the apparatus comprising at least one portion of a first electronic device, the apparatus comprising:

a determination circuit, positioned in the first electronic device, arranged for determining whether a predetermined activity corresponding to both of the first electronic device and a second electronic device occurs, to generate a determination result; and a processing circuit, positioned in the first electronic device and coupled to the determination circuit, wherein according to the determination result, the processing circuit selectively sends, by utilizing a transmitter within the first electronic device, a switching request from the first electronic device to a service provider, wherein a phone number is previously associated to a first subscriber identity module (SIM) within the first electronic device by the service provider, and the switching request asks for re-associating the phone number to a second SIM within the second electronic device;

wherein the second SIM is a physical component positioned within the second electronic device.

11. A phone number switching method, the phone number switching method being applied to a second electronic device, the phone number switching method comprising the steps of:

determining whether a predetermined activity corresponding to both of a first electronic device and the second electronic device occurs, to generate a determination result, wherein a phone number is previously associated to a first subscriber identity module (SIM) within the first electronic device by a service provider; and according to the determination result, selectively sending a signal to the first electronic device, wherein the signal indicates that sending a switching request to the service provider is required, and the switching request asks for re-associating the phone number to a second SIM within the second electronic device, wherein after receiving the signal from the second electronic device, the first electronic device sends the switching request to the service provider;

wherein the second SIM is a physical component positioned within the second electronic device.

12. The phone number switching method of claim 11, wherein the predetermined activity comprises making the second electronic device be close to or in contact with the first electronic device.

13. The phone number switching method of claim 12, wherein the step of determining whether the predetermined activity occurs to generate the determination result further comprises:

determining whether the second electronic device is close to or in contact with the first electronic device, to generate the determination result.

14. The phone number switching method of claim 12, wherein when the second electronic device is close to or in contact with the first electronic device, the second electronic device sends the signal to the first electronic device.

15. The phone number switching method of claim 11, wherein at least one of the first SIM and the second SIM is a SIM card.

16. The phone number switching method of claim 11, wherein at least one of the first SIM and the second SIM is an embedded SIM (e-SIM).

17. The phone number switching method of claim 11, wherein the first electronic device and the second electronic device comprise a wearable electronic device, a mobile phone, or a tablet.

18. The phone number switching method of claim 11, wherein the second electronic device determines whether another predetermined activity corresponding to both of the first electronic device and the second electronic device occurs, to generate another determination result; and according to the other determination result, the second electronic device selectively sends another switching request from the second electronic device to the service provider, wherein the phone number has been re-associated to the second SIM, and the other switching request asks for re-associating the phone number to the first SIM.

19. The phone number switching method of claim 11, wherein the phone number has been re-associated to the second SIM; the first electronic device is equipped with another SIM, and another phone number is associated to the other SIM within the first electronic device; and the phone number switching method further comprises:

performing communications between the second electronic device and the first electronic device with aid of the second SIM within the second electronic device and the other SIM within the first electronic device.

20. An apparatus for performing phone number switching according to the phone number switching method of claim 11, wherein the apparatus comprises at least one portion of the second electronic device.

\* \* \* \* \*